US012615457B2

(12) United States Patent
Stevens et al.

(10) Patent No.:     US 12,615,457 B2
(45) Date of Patent:     Apr. 28, 2026

(54) CONFIGURATION MODULE FOR CONFIGURING A RADIOFREQUENCY SENSING NETWORK

(71) Applicant: SIGNIFY HOLDING B.V., Eindhoven (NL)

(72) Inventors: Hendrik Stevens, Waalre (NL); Hugo José Krajnc, Eindhoven (NL); Leendert Teunis Rozendaal, Valkenswaard (NL); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/277,813

(22) PCT Filed: Feb. 14, 2022

(86) PCT No.: PCT/EP2022/053455
§ 371 (c)(1),
(2) Date: Aug. 18, 2023

(87) PCT Pub. No.: WO2022/175190
PCT Pub. Date: Aug. 25, 2022

(65) Prior Publication Data
US 2024/0314472 A1     Sep. 19, 2024

Related U.S. Application Data

(60) Provisional application No. 63/151,314, filed on Feb. 19, 2021.

(30) Foreign Application Priority Data

Mar. 4, 2021    (EP) .................................... 21160637

(51) Int. Cl.
*H04Q 9/00*          (2006.01)

(52) U.S. Cl.
CPC ........... *H04Q 9/00* (2013.01); *H04Q 2209/43* (2013.01)

(58) Field of Classification Search
CPC .. H04Q 9/00; H04Q 2209/00; H04Q 2209/10; H04Q 2209/40; H04Q 2209/43;
(Continued)

(56) References Cited

U.S. PATENT DOCUMENTS 9,584,974 B1 *   2/2017   Omer ..................... H04W 4/023
10,798,529 B1 *   10/2020   Beg ........................ H04W 24/10
(Continued)

FOREIGN PATENT DOCUMENTS

WO          2019076463 A1      4/2019

OTHER PUBLICATIONS

Luomala, Jari, et al., "Effects of Temperature and Humidity on Radio Signal Strength in Outdoor Wireless Sensor Networks," Proceedings of the Federated Conference on Computer Science and Information Systems, ASCIS, vol. 5, 2015 (9 Pages).
(Continued)

*Primary Examiner* — Franklin D Balseca

(57)          ABSTRACT

The invention refers to a configuration module 100 for configuring a radiofrequency sensing network 200 with network devices 210, 220, 230, 240. The configuration module comprises a providing unit 101 for providing a reference relation between a) an ambient parameter value, wherein the ambient parameter correlates with a propagation property of an ambient medium for radiofrequency signals, and b) a received signal feature value indicative of a signal that has propagated through the ambient medium and has been received by the network device. A further providing unit 102 provides a configuration value of the ambient
(Continued)

parameter indicative of a value of the ambient parameter at a configuration time, and a determining unit 103 determines a value of an operating variable associated with the network device based on the reference relation and the configuration value. This allows to achieve an increased independence of the sensing results from environmental conditions.

11 Claims, 3 Drawing Sheets

(58) Field of Classification Search
CPC ........... H04Q 2209/70; H04Q 2209/80; H04Q 2209/84; H04B 17/318
See application file for complete search history.

(56) References Cited

U.S. PATENT DOCUMENTS

| | | | |
|---|---|---|---|
| 2016/0164563 A1 | 6/2016 | Khawand et al. | |
| 2018/0292520 A1 | 10/2018 | Bermudez et al. | |
| 2020/0343980 A1 | 10/2020 | Kilian et al. | |
| 2021/0076229 A1* | 3/2021 | Rost ..................... | H04W 24/08 |
| 2023/0168212 A1 | 6/2023 | Deixler et al. | |
| 2023/0240204 A1 | 8/2023 | Deixler et al. | |

OTHER PUBLICATIONS

Wang, Jie, et al., "Robust Device-Free Wireless Localization Based on Differential RSS Measurements," IEEE Transactions on Industrial Electronics, vol. 60, No. 12, Dec. 2013 (10 Pages).

* cited by examiner

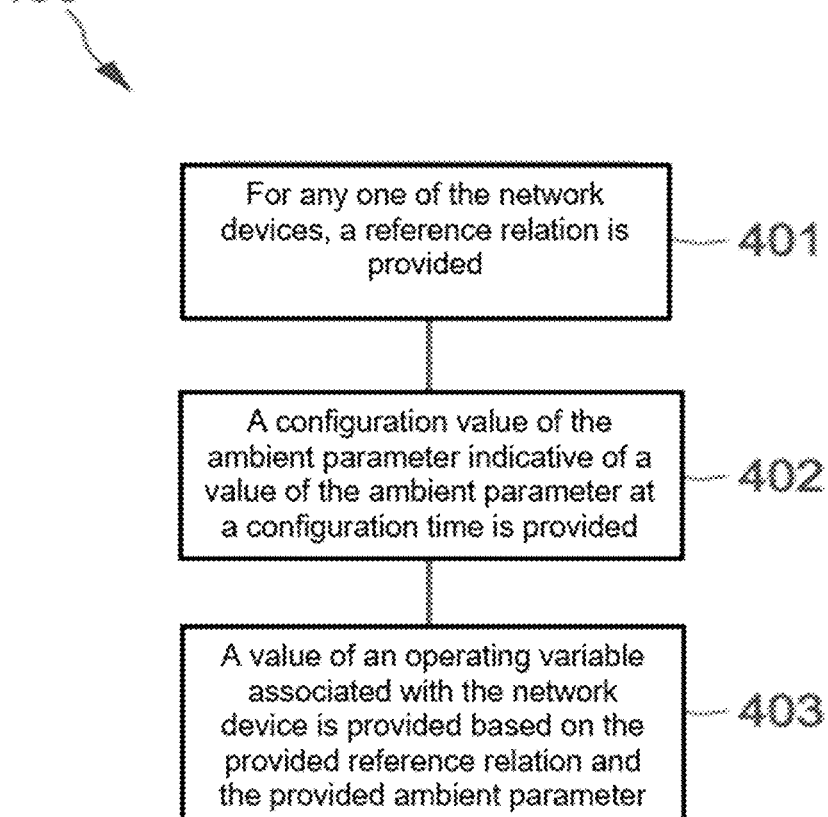

400

401 — For any one of the network devices, a reference relation is provided

402 — A configuration value of the ambient parameter indicative of a value of the ambient parameter at a configuration time is provided 403 — A value of an operating variable associated with the network device is provided based on the provided reference relation and the provided ambient parameter configuration value

FIG. 3

CONFIGURATION MODULE FOR CONFIGURING A RADIOFREQUENCY SENSING NETWORK

CROSS-REFERENCE TO PRIOR APPLICATIONS

This application is the U.S. National Phase application under 35 U.S.C. § 371 of International Application No. PCT/EP2022/053455, filed on Feb. 14, 2022, which claims the benefit of U.S. Provisional Patent Application No. 63/151,314, filed on Feb. 19, 2021 and European Patent Application No. 21160637.1, filed on Mar. 4, 2021. These applications are hereby incorporated by reference herein.

FIELD OF THE INVENTION

The invention relates to a configuration module, a radiofrequency sensing network, a configuration method and a computer program product for configuring a radiofrequency sensing network comprising one or more network devices.

BACKGROUND OF THE INVENTION

In radiofrequency sensing, received radiofrequency signals are used to infer information on a potential presence or motion of a sensing target, such as a human, for instance. The information is typically inferred based on variations in a received radiofrequency signal observed in time and/or in relation to calibrated reference signal curves. A main challenge is therefore to distinguish between variations in the received radiofrequency signals that are caused by the presence or motion of sensing targets and other variations. Particularly, challenging to account for are those other variations that cannot be controlled. Such variations include, for instance, variations in the received radiofrequency signals that are caused by changes in the environment of a radiofrequency sensing device that are unrelated to a sensing target. Consequently, the accuracy of radiofrequency sensing generally decreases under significant variations in environmental conditions. It would be desirable to establish an increased degree of independence of radiofrequency sensing results from environmental conditions.

WO2019076463A1 discloses an apparatus configured to execute a communication network analysis and management, and with at least one processing circuitry, configured to cause the apparatus at least: to receive, and store performance information indicating a communication performance in the mobile communication network measured at the at least one communication network control element or function, to receive and store configuration information indicating configuration parameters for the mobile communication network, to receive, from at least one sensor configured to measure an environmental parameter, and store environmental information indicating a result of an environmental parameter measurement, the environmental parameter measurement being different to a measurement conducted by the at least one communication network control element or function, to conduct a processing for correlating the performance information, the configuration information and the environmental information for analyzing an impact of the environmental parameter on the communication performance in the mobile communication network, and to decide, on the basis of a result of the processing for correlating, about at least one measure to be conducted in the mobile communication network for modifying a setting of the mobile communication network.

SUMMARY OF THE INVENTION

It is an object of the present invention to provide a configuration module, a radiofrequency sensing network, a configuration method and a computer program product that allow to increase the independence of radiofrequency sensing results from environmental conditions.

In a first aspect of the present invention, a configuration module for configuring a radiofrequency sensing network comprising one or more network devices adapted to receive and transmit radiofrequency signals is presented, wherein the configuration module comprises i) a reference relation providing unit for providing, for any one of the network devices, a reference relation between a) an ambient parameter reference value indicative of a reference value of an ambient parameter, wherein the ambient parameter correlates with a propagation property of an ambient medium for radiofrequency signals, and b) a received signal feature reference value indicative of a reference value of a feature of a signal that has propagated through the ambient medium and has been received by the network device, ii) an ambient parameter configuration value providing unit for providing a configuration value of the ambient parameter indicative of a value of the ambient parameter at a configuration time, and iii) an operating variable value determining unit for determining a value of an operating variable associated with the network device based on the provided reference relation and the provided ambient parameter configuration value.

Since the reference relation providing unit provides, for any one of the network devices of the radiofrequency sensing network, a reference relation between a) an ambient parameter reference value indicative of a reference value of an ambient parameter, wherein the ambient parameter correlates with the propagation property of an ambient medium for radiofrequency signals, and b) a received signal feature reference value indicative of a reference value of a feature of a signal that has propagated through the ambient medium and has been received by the network device, knowledge about a correlation between the propagation property of the ambient medium for radiofrequency signals and the received signal feature can be obtained. Since, furthermore, ambient parameter configuration value providing unit provides a configuration value of the ambient parameter indicative of a value of the ambient parameter at a configuration time, wherein the operating variable value determining unit determines a value of an operating variable associated with the network device based on the provided reference relation and the provided ambient parameter configuration value, the obtained knowledge can be used as reference knowledge in the configuration of the radiofrequency sensing network. Since the configuration of the radiofrequency sensing network determines how sensing results are obtained based on radiofrequency signals received by the one or more network devices of the radiofrequency sensing network, an increased independence of the sensing results from environmental conditions can be achieved.

The configuration module is adapted to configure the radiofrequency sensing network. Configuring the radiofrequency sensing network may refer to configuring one or more network devices of the radiofrequency sensing network. The radiofrequency sensing network preferably comprises at least two network devices, more preferably at least three network devices. In an embodiment, the radiofrequency sensing network can be or be part of a lighting system, in which case the network devices can be lights whose light output is controlled based on sensing results. Moreover, the radiofrequency sensing network may be or be part of a smart home system, in which case the network device may be any smart home device executing a function, for instance, based on sensing results.

The network devices preferably each comprise a communication unit adapted to receive and transmit wireless signals, particularly radiofrequency signals, and/or wired signals for communication. The communication unit of a network device, which can also be referred to as a network device communication unit, may comprise a receiving unit and a transmitting unit, wherein the receiving unit and the transmitting unit may also be integrated with each other in the form of a transceiver, for instance. Radiofrequency signals are understood herein as wireless signals constituted by electromagnetic radiation in the radiofrequency range.

The radiofrequency sensing network can comprise the configuration module and possibly further configuration modules. However, the radiofrequency sensing network may also be regarded as not comprising the one or more configuration modules. Also each of the configuration modules may comprise a communication unit that is adapted to receive and transmit wireless signals, particularly radiofrequency signals, and/or wired signals for communication, wherein also each of the communication units of the configuration modules, which can also be referred to as configuration module communication units, may comprise a receiving unit and a transmitting unit, possibly integrated with each other in the form of a transceiver. Communication between a configuration module and a network device, among different configuration modules and/or among different network devices preferably comprises an exchange of wireless and/or wired signals between the respective communication units.

In some embodiments, one or more of the network devices may comprise the configuration module configuring them. For instance, each network device may comprise a configuration module configuring the respective network device. If a network device comprises a configuration module configuring the network device, the network device communication unit and the configuration module communication unit may be a single unit. The configuration of the radiofrequency sensing network may be understood as comprising the configurations of each of the network devices. It might be preferred that if a configuration module is provided in a given network device for configuring this network device, then this configuration module is also adapted to configure other, preferably all other, network devices. The configuration module may also be provided as a separate device adapted to configure any number, particularly all, of the network devices of the radiofrequency sensing network. In fact, the configuration module may also be located in a cloud, such as on one or more servers, for instance. In that case, the configuration module communication unit may comprise means via which a user of the radiofrequency sensing network is connected to the cloud, such as, for instance, a router via which he/she is connected to the Internet.

The configuration module comprises a reference relation providing unit that is adapted to provide a reference relation for the network device to be configured by the configuration module. The provided reference relation is a relation between an ambient parameter reference value and a received signal feature reference value, wherein the ambient parameter reference value is indicative of a reference value of an ambient parameter that correlates with a propagation property of an ambient medium for radiofrequency signals and wherein the received signal feature reference value is indicative of a reference value of a feature of a signal that has propagated through the ambient medium and has been received by the network device.

The ambient medium refers to a medium ambient to the network device. In many cases, the ambient medium is identifiable with the medium ambient to the other network devices of the radiofrequency sensing network as well, particularly if the network devices of the radiofrequency sensing network are not separated too far from each other. For instance, the ambient medium can be the air filling the space between the network devices of the radiofrequency sensing network. The propagation property of the ambient medium for radiofrequency signals refers to a property describing or characterizing the propagation of radiofrequency signals through the ambient medium. The ambient parameter is a parameter correlating with the propagation property. That the ambient parameter correlates with the propagation property of the ambient medium for radiofrequency signals means that it at least partially characterizes how radiofrequency signals propagate through the ambient medium. Values of the ambient parameter may therefore by viewed as an indication of how radiofrequency signals propagate through the ambient medium. In some cases, the correlation may in fact be, or be viewed as, a causal relationship. In these cases, values of the ambient parameter may at least partially determine, or be viewed as determining at least partially, the propagation property of the ambient medium for radiofrequency signals. The ambient parameter is preferentially a humidity, more preferably a relative humidity, a concentration of ions, a pressure and/or a temperature of the ambient medium, particularly in a region into which the network device is adapted to transmit signals and/or from which the network device is adapted to receive signals transmitted with a predetermined strength. For instance, an air pressure can refer to an atmospheric pressure, a temperature of air to an atmospheric temperature and a relative humidity in the air to an atmospheric relative humidity. Low values, i.e. values relatively close to 0%, in relative humidity refer to dry environments, while high values, i.e. values relatively close to 100%, in relative humidity mean that the ambient medium is saturated and therefore unable to hold any more moisture like water vapor such that condensation or rain may form. The ambient parameter can also refer to a wind direction, particularly a wind direction relative to the direction from which a radiofrequency signal has been received by the network device to be configured. It has been shown that wind can have an effect on a propagation of radiofrequency signals, as explained, for instance, in the article "Wind versus UHF Radio signal", by J. Amajama, International Journal of Science, Engineering and Technology Research (IJSETR), Nr. 5, pages 583-585, (2016). Moreover, the wind effects a surrounding of the network devices, for instance, by swaying trees, etc. and can thus also indirectly influence the radiofrequency signal. Moreover, also network devices outside protective structures can be directly influenced by wind. For example, wind can cause a movement, in particular, swaying, of the mounting structure of a network device and thus also influence the radiofrequency sensing.

The received signal feature can refer, for instance, to quantities like a strength, a phase, a frequency, a time of flight, a signal-to-noise ratio or a peak-to-peak noise amplitude of the received signal, or to a variation in one or more of these quantities. A variation in frequency might, for instance, arise from Doppler effects. Particularly, if the radiofrequency sensing network is a Wi-Fi network, the received signal feature can be any feature related to or derived from a received signal strength indicator (RSSI) and/or the channel state information (CSI). The received signal feature reference value is preferably indicative of a reference value of the feature of the received signal upon reception. The received signal feature reference value is preferentially indicative of a value of a feature of a received reference signal, wherein the reference signal has been received by the network device when the ambient parameter had the value related to the received signal feature reference value via the reference relation.

The reference relation may be provided based on a reference measurement that may be performed at a reference time, in which case reference values may be regarded as values measured at the reference time. In principle, however, the reference relation may also be provided based on a known correlation between the ambient parameter, the propagation property of the ambient medium for radiofrequency signals and/or the received signal feature, such as based on a known analytic or measured relationship, for instance. The reference relation may be provided in the form of a table or array.

The received signal feature may refer to a multiple-valued feature, i.e. a feature, such as a matrix, that may assume a plurality of values at the same time, i.e. for a single signal. Moreover, the reference relation provided by the reference relation providing unit may be a relation between the ambient parameter reference value and the respective reference values of more than one received signal feature. In fact, the reference relation may also be a relation between the respective reference values of more than one ambient parameter, or a multiple-valued ambient parameter comprising more than one value at a same time and/or for a single signal, and the respective reference values of the one or more received signal features.

The ambient parameter configuration value providing unit is adapted to provide a configuration value of the ambient parameter indicative of a value of the ambient parameter at a configuration time. If the reference relation is a relation between the respective reference values of more than one ambient parameter, or a multiple-valued ambient parameter comprising more than one value at a same time and/or a single signal, and the respective reference values of the one or more received signal features, then also corresponding more than one ambient parameter configuration values may be provided. The configuration time is preferentially a current time, in which case the ambient parameter configuration value is a current value of the ambient parameter. The reference relation, on the other hand, preferentially refers to a relation at a reference time. For instance, if the reference relation has been provided based on a reference measurement, the reference measurement may have been performed at a reference time. And if a reference relation has been provided based on a known correlation between the ambient parameter and the propagation property of the ambient medium for radiofrequency signals and/or the received signal feature, the known correlation may refer to a correlation at a reference time. In any case, the reference time may refer to a time lying, in absolute terms, before the configuration time. In relative terms, such as in terms of a time during a given day or in the course of a year, for instance, the reference time may also refer to a time later than or corresponding to the configuration time.

The operating variable value determining unit is adapted to determine a value of at least one operating variable associated with the network device based on the provided reference relation and the provided ambient parameter configuration value. The at least one operating variable may refer to any variable whose change influences how signals received by the network device to be configured enter sensing results and/or how the network device to be configured is controlled. The operating variable value determining unit is preferentially adapted to compare the configuration value of the ambient parameter provided by the ambient parameter configuration value with the reference value of the ambient parameter included in the reference relation and to determine the value of the operating variable associated with the network device based on the received signal feature reference value related via the reference relation to the ambient parameter reference value and a result of the comparison. For instance, the value of the operating variable may be determined based on the received signal feature reference value related via the reference relation to the ambient parameter reference value only if the comparison indicates that the ambient parameter configuration value corresponds to the ambient parameter reference value.

In some embodiments, the radiofrequency sensing network may be or be part of a system affecting the ambient parameter in a controlled manner. In this case, an effect of changes in a value of the ambient parameter on the propagation of radiofrequency signals and hence the received signal feature reference values can be known, i.e., for instance, analytically or from calibration of the system, and hence provided in terms of a reference relation. For instance, one or more network devices may comprise UV-C disinfection lights whose light output may increase the ion concentration in the ambient medium, wherein the reference relation may indicate a dependence of received signal feature reference values on the light output of the one or more UV-C disinfectant lights and wherein the operating variable value may be determined based on the reference relation and a light output of the one or more UV-C disinfectant lights at a configuration time, particularly a current time during sensing.

Preferably, the reference relation relates different reference values of the ambient parameter to different reference values of the received signal feature. The reference relation may therefore also be understood as a, possibly discrete, function assigning to each of the different reference values of the ambient parameter a corresponding reference value of the received signal feature, i.e., if the signal feature is single-valued. It is understood that different reference values of the ambient parameter can be related by the reference relation to the same reference values of the received signal feature. The operating variable value determining unit can be adapted to determine the value of the operating variable associated with the network device based particularly on a comparison between the ambient parameter configuration value with each of the ambient parameter reference values included in the reference relation and determine the operating variable value based on the received signal feature reference value related via the reference relation to the ambient parameter reference value for which the comparison has resulted in a highest degree of similarity.

The ambient parameter reference values included in the reference relation, as well as the ambient parameter configuration value, may be determined using an ambient parameter measurement device. The ambient parameter measurement device may be integrated in the configuration module or the network device to be configured, but may also be located remotely. The received signal feature reference value is preferably determined based on a measurement performed by the network device itself.

In some embodiments, the configuration module further comprises an implementing unit for implementing a configuration of the network based on the determined value of the operating variable. Implementing the configuration of the network based on the determined operating variable value may refer to configuring the network such that sensing is performed by the network based on the determined operating variable value. In this way, how the operating variable value is determined, i.e. which values are assigned to the operating variable, has an immediate impact on the sensing results achieved.

In further embodiments, the reference relation has been recorded over a reference time span, thereby relating ambient parameter reference values recorded over the reference time span to corresponding received signal feature reference values. The reference time span is preferentially chosen such that a sensing result arrived at by the network device during the reference time span is constant, particularly indicating no human presence or other sources of interference such as air drafts, objects or wireless noise from a microwave. For instance, the reference time span may be chosen such that a sensing result arrived at by the network device during the reference time span is representative of a sensing result expected at the configuration time, in an environment in which the network device is intended to fulfil its sensing function and/or for an intended application of the sensing function. In particular, the reference relation may be recorded over several different reference time spans, wherein the operating variable value determining unit may be adapted to determine the value of the operating variable associated with the network device based on a reference relation selected out of the several recorded reference relations and the provided ambient parameter configuration value, wherein the reference relation may be selected such that a sensing result arrived at by the network during the reference time span is representative of a sensing result expected at the configuration time, in an environment in which the network device is intended to fulfil its sensing function and/or for an intended application of the sensing function. For instance, a database of reference relations may be established, wherein the database comprises one or more reference relations for each of a plurality of sensing result patterns in different environments and/or for different sensing applications.

In some embodiments, the operating variable value determining unit is adapted to determine the value of the operating variable associated with the network device without reference to any values of the received signal feature at the configuration time, particularly a current time. In this way, a fixed value of the operating variable can be determined for a given reference relation and a given ambient parameter configuration value such that, for instance, the operating variable value determining unit does not need to determine new values of the operating variable for different positions of the network device, which are generally associated with different received signal feature reference values. However, it is also possible that received signal feature reference values determined during configuration, particularly received signal features reference values used for sensing, enter the determination of the operating variable value. Thus, in some embodiments, the configuration module further comprises a received signal feature configuration value providing unit for providing a received signal feature configuration value, the received signal feature configuration value being a value of the received signal feature for a signal received by the network device at the configuration time, wherein the operating variable value determining unit is adapted to determine the value of the operating variable associated with the network device further based on the received signal feature configuration value. The received signal feature configuration value providing unit may, in particular, be adapted to provide received signal feature configuration values, the received signal feature configuration values being values of the received signal feature for signals received by the network device over a configuration time span, wherein the operating variable value determining unit may be adapted to determine the value of the operating variable associated with the network device further based on the received signal feature configuration values. Preferentially, the configuration time span includes the configuration time, which can be a current time. The received signal feature configuration values can hence also be current values of the received signal feature, i.e. values of the received signal feature that are to be used for arriving at a sensing result. Determining the operating variable value based also on a received signal feature configuration value allows for a more flexible determination of the operating variable value. In particular, the operating variable value can be determined in terms of a function that may be nonlinear in the received signal feature reference value. In an exemplary embodiment, the operating variable value determining unit is adapted to determine the operating variable value by a prescription that can be formulated as $$\Omega = f(\sigma_r = \rho(\pi_r); \pi_c, \sigma_c)|_{\pi_r = \pi_c}, \tag{1}$$

wherein $\Omega$ refers to the operating variable value, $\pi_r$ refers to the ambient parameter reference value, $\sigma_r = \rho(\pi_r)$ refers to the received signal feature reference value related by the reference relation $\rho$ to the ambient parameter reference value $\pi_r$, $\pi_c$ refers to the ambient parameter configuration value, $\sigma_c$ refers to the received signal feature configuration value, and $f$ is a function that might be nonlinear in its last argument and which is evaluated in the above equation at $\pi_r = \pi_c$. More generally, it might be evaluated at the ambient parameter reference value $\pi_r$ that is closest to the ambient parameter configuration value $\pi_c$. This is to account for the circumstance that in many cases, due to a finite resolution of recordings of the ambient parameter, no ambient parameter reference value $\pi_r$ that is identical to the provided ambient parameter configuration value $\pi_c$ is recorded.

The operating variable value determining unit may be adapted to determine the value of the operating variable associated with the network device based on a characteristic received signal feature reference value and a characteristic received signal feature configuration value which are determined from received signal feature reference values in a reference time interval and a configuration time interval, respectively, wherein the reference time interval may be chosen such that it includes a received signal feature reference value related, via the reference relation, to an ambient parameter reference value corresponding to the ambient parameter configuration value. Determining the operating variable value based on characteristic received signal feature reference and configuration values, wherein the characteristic values are characteristic for a reference and a configuration time interval, respectively, allows for a more robust determination of the operating variable value, i.e. a determination that is less prone to inaccuracies due to noise or other uncontrolled fluctuations in the received signal. The reference time interval and the configuration time interval are preferably time intervals in the reference time span and the configuration time span, respectively. The characteristic values may refer to a respective average, variance, maximum or minimum, overall increase or decrease and/or a parameter of an approximate functional form in the respective time interval, for instance. It is also possible that the reference time span is divided into several reference time intervals, wherein the reference relation relates characteristic received signal feature reference values for the several reference time intervals to ambient parameter reference values determined for the respective reference time intervals and wherein the operating variable value is determined based on the reference relation and a characteristic received signal feature configuration value determined for a configuration time interval.

In some embodiments, the operating variable value indicates a modification of a value of the received signal feature for signals received by the network device and/or a modification of a transmission value of the signal feature for a network device transmitting the signals, wherein the modified value of the signal feature is used for sensing. The transmission value of the signal feature for the network device transmitting the signals preferably refers to a value of the signal feature upon transmission. That is to say, the feature of the received signal preferably has a value upon reception and a value upon transmission.

The modification of the received signal feature value may preferably refer to a numerical modification, i.e. to a modification of how a feature of a signal received by the network device is processed. In an embodiment, the network device may be adapted to modify received signal feature values according to the operating variable value determined by the operating variable value determining unit, wherein the radiofrequency sensing network may comprise a processing unit for processing the received signal feature values for the signals received by the one or more network devices of the radiofrequency sensing network and wherein the network device that has modified the received signal feature value may be adapted to provide the modified received signal feature value to the processing unit for processing. In another embodiment, the one or more network devices of the radiofrequency sensing network may be adapted to provide non-modified received signal feature values for the signals received by them to the processing unit for processing, wherein the processing unit may be adapted to modify the received signal feature values received by the one or more network devices of the radiofrequency sensing network according to the operating variable values determined by the operating variable value determining unit or units for the respective network devices. Hence, the modification of received signal feature values can be performed locally, i.e. by each network device separately, or centrally, i.e. by one processing unit of the network for all network devices. The processing unit of the radiofrequency sensing network may be comprised in a separate device, such as a control device, of the radiofrequency sensing network, but may also be comprised in one of the network devices. If the modifications are performed by the processing unit, the processing unit may comprise a pre-processing unit for performing the modifications, wherein the pre-processing unit provides the modified received signal feature values such that they can be further processed by the processing unit as if they were non-modified. The processing unit may be regarded as being adapted to determine sensing results of the radiofrequency sensing network based on received signal features values determined by the one or more network devices.

While modifications to the received signal feature values may be understood as modifications potentially changing sensing results arrived at by the radiofrequency sensing network even though the signals actually exchanged by the one or more network devices of the radiofrequency sensing network have not been changed, a corresponding potential change in the sensing results arrived at by the network may also be achieved without changing the way how the received signal feature values are processed, namely by transmitting the signals in a modified way. For instance, instead of modifying the received signal strength values for signals received by a network device numerically, the signals can also be transmitted with an increased strength, which amounts to modifying the transmitted signal strength values corresponding to the received signal strength values. A modification of the received signal strength can also be achieved, for instance, by shifting a transmission frequency while maintaining a reception frequency, for instance.

In some embodiments, the signal feature is a signal strength, wherein the ambient parameter correlates with an attenuation of radiofrequency signals propagating through the ambient medium and wherein the modification comprises a multiplication with a scaling factor and/or a shift by an offset. Since the strength of a radiofrequency signal and its attenuation over a path along which it has propagated is a good indicator of the presence of a sensing target in the path, choosing an ambient parameter that correlates with the attenuation of radiofrequency signals by the ambient medium and modifying the received signal strength or transmitted signal strength values depending on values of such an ambient parameter allows for a particularly increased independence of the sensing performance from environmental conditions. In an exemplary embodiment, the operating variable value determining unit is adapted to determine a linear modification of received signal strengths by a prescription that can be formulated as $$\sigma' = f_1(\sigma_r = \rho(\pi_r); \pi_c)|_{\pi_r = \pi_c} \cdot \sigma + f_0(\sigma_r = \rho(\pi_r); \pi_c)|_{\pi_r = \pi_c}, \qquad (2)$$

wherein $\sigma'$ refers to the modified received signal strength, $\pi_r$ refers to the ambient parameter reference value, $\sigma_r = \rho(\pi_r)$ refers to the received signal reference strength related by the reference relation $\rho$ to the ambient parameter reference value $\pi_r$, $\pi_c$ refers to the ambient parameter configuration value, $\sigma$ refers to the received signal strength before modification, and $f_1$ and $f_0$ are the scaling factor and shift part of the modification, respectively, which are both evaluated in the above equation at $\pi_r = \pi_c$ and neither of which depends on the received signal strength $\sigma$. More generally, $f_1$ and $f_0$ may be evaluated at the ambient parameter reference value $\pi_r$ that is closest to the ambient parameter configuration value $\pi_c$.

It has been found that hydrometeors, such as rain, clouds, fog and snow, for instance, reduce the received signal strength of wireless signals such as radiofrequency signals. In particular, it has been found that the attenuation of radiofrequency signals due to hydrometeors grows with increasing frequency of the radiofrequency signals. For instance, the attenuation of radiofrequency signals transmitted at a frequency of 60 GHz due to hydrometeors is higher than a corresponding attenuation of radiofrequency signals transmitted at a frequency of 5 GHz, and a corresponding attenuation of radiofrequency signals transmitted at a frequency of 2.4 GHz is even less. Further details are disclosed, for instance, in the article "Atmospheric Attenuation due to Humidity, Electromagnetic Waves", by M. Tamosiunaite et al., Vitaliy Zhurbenko, IntechOpen (2011). In the article "Effect of fog and clouds on the image quality in millimeter communications" by H. Chen et al., International Journal of Infrared and Millimeter Waves, Volume 25/5, pages 1572-9559 (2004), it is concluded that for millimeter wave communication, fog is the dominant factor in determination of the reliability, especially in coastal areas, where dense moist fog with high liquid water content develops frequently. In marine wireless communication, the radio wave propagation near the sea surface is known to be affected by the evaporation duct which is formed due to variation and humidity across the air and sea boundary. This evaporation duct is known to mainly affect signals at frequencies around 1 GHz and higher. It has also been found that a high relative humidity in the air reduces received signal strengths. Interestingly, the absolute humidity shows only little or no correlation with received signal strengths. Further details are disclosed in the article "Effects of Temperature and Humidity on Radio Signal Strengths in Outdoor Wireless Sensor Networks" by J. Luomala et al., Proceedings of the Federated Conference on Computer Science and Information Systems, Volume 5, pages 1247-1255 (2015).

Hence, preferably received signal strengths or other channel state information are corrected for radiofrequency sensing purposes based on a present humidity, particularly relative humidity, in a sensing area. In an embodiment, the reference relation provided by the reference relation providing unit may be a relation between a) a relative humidity reference value indicative of a reference value of a relative humidity in a region in which the radiofrequency sensing network is adapted to sense and b) a received signal reference strength of a signal that has propagated through the region in which the network is adapted to sense and has been received by the network device to be configured by the configuration module, the ambient parameter configuration value providing unit, which may then also be viewed as a relative humidity configuration value providing unit, provides a configuration value of the relative humidity indicative of a value of the relative humidity at a configuration time, and the operating variable value determining unit determines the value of the operating variable associated with the network device based on the provided reference relation and the provided relative humidity configuration value. The region in which the radiofrequency sensing network is adapted to sense may be understood as a sensing region. The relative humidity reference value as well as the relative humidity configuration value may be measured using a relative humidity sensor located in the sensing region. Such humidity sensors are known for indoor as well as for outdoor applications, such that the sensing region may be indoor and/or outdoor. The humidity sensor can be part of the radiofrequency sensing network. It can also be included in one of the network devices. In some cases, a plurality of the network devices or all of the network devices of the radiofrequency sensing network may comprise a humidity sensor. Network devices comprising their own humidity sensors may be preferred especially in outdoor applications, where the relative humidity can vary with temperature and temperature can vary with the distance from the ground under certain conditions, such that the relative humidity measured depends on the distance from the ground at which the network device is installed. It is also possible that the humidity sensor is integrated in a control module controlling the radiofrequency sensing network. Such a control module may also control other devices. For instance, such as in the case of the radiofrequency sensing network being a smart home system, wherein the network devices are smart devices, for instance, the humidity sensor may be integrated in a heating, ventilation and air conditioning (HVAC) room controller user interface, which may be wall mounted, for instance. However, the humidity sensor may also be a device unrelated to the radiofrequency sensing network and only providing a sensing result such that at least one of the network devices or a control module can access the sensing results of the humidity sensor, for example, via a connection to a cloud storage or a server on which the sensing results are stored. In some embodiments, the relative humidity reference values are received from a local weather station measuring relative humidity in a geographic region including the sensing region.

Although a general correlation between the ambient parameter and the propagation property of the ambient medium might be known, the knowledge might not suffice for determining the operating variable value such that the sensing performance can be increased. For instance, it might be known that the relative humidity of air generally correlates positively with an attenuation of signals during propagation through the air, but it might not be known how strong the attenuation is for a given relative humidity. Moreover, the needed modifications to the operating variable values can depend on the environment of the radiofrequency sensing network, such that there will generally be no one-fits-all solution. In other words, even if an analytic relation between the propagation property of the ambient medium and the ambient parameter can be derived, translating this relation to an analytic relation also between the received signal feature reference values and the ambient parameter reference values will generally be relatively complex or even practically impossible, since the received signal feature reference values depend not only on the propagation property of the ambient medium but also on other influences from the environment, which might additionally vary in time. It is therefore preferred to apply a specific learning algorithm for analyzing the impact of variations in the ambient parameter on the received signal feature reference values in the sensing area.

In an embodiment, the reference time span, i.e. the time span over which the reference relation is recorded, may be chosen such that the ambient parameter reference values recorded in the reference time span vary across a predefined minimum range. In this way, greater insights into the impact of variations in the ambient parameter on the received signal feature reference value can be obtained.

In a further embodiment, a correction factor and/or a shift in the received signal feature can be determined based on the provided reference relation for each recorded value of the ambient parameter. This determination can be, for instance, the result of the specific learning algorithm applied, which may be executed, for instance, by the operating variable value determining unit or already by the reference relation providing unit, but which may also be executed by a separate unit of the configuration module or a separate module. For any value of the ambient parameter determined at the configuration time, preferably during sensing, it can then be determined to which ambient parameter value recorded in the reference time span this value corresponds, wherein the correction factor and/or shift that has been determined for this corresponding value of the ambient parameter recorded over the reference time span can be used for modifying received signal feature values during sensing. In this way, effects of a changing humidity in the environment of the radiofrequency sensing network on the measurements and/or the analysis performed to arrive at sensing results can be compensated.

In some embodiments, sensing results may be obtained by the radiofrequency sensing network by comparing received signal features values determined for a plurality, particularly all, of the network device in the network to a baseline, wherein the baseline may correspond to received signal feature values of the network devices that would be expected for a particular basic sensing result. The basic sensing result may correspond to a null result indicating, for instance, no presence and/or no motion of a sensing target like a human. In such embodiments, determining the operating variable value may also refer to a modification of the baseline. Applying a given modification to the baseline may have the same effect as applying a corresponding modification, particularly the inverse modification, to the received signal feature values.

In further embodiments, the operating variable value determining unit is adapted to determine the value of the operating variable based on received signal feature reference values corresponding to different ambient parameter reference values. Accordingly, the different received signal feature reference values may be characteristic for respective different reference time intervals. In particular, characteristic received signal reference values from several reference time intervals and characteristic received signal configuration values from several configuration time intervals may be used for determining the operating variable value.

In some embodiments, if the reference relation relates a first ambient parameter reference value to a first received signal feature reference value and a second ambient parameter reference value to a second received signal feature reference value, wherein the second ambient parameter reference value is greater than the first ambient parameter reference value, the operating variable value may be determined such that received signal feature values are increased with increasing ambient parameter configuration values in case the second received signal feature reference value is higher than the first received signal feature reference value, and such that received signal feature values are decreased with increasing ambient parameter configuration values in case the second received signal feature reference value is less than the first received signal feature reference value. It may also be preferred that the reference relation comprises several pairs of ambient parameter reference values and received signal feature reference values, wherein the operating variable value determination unit is adapted to fit a model of signal propagation through the ambient medium to the several pairs, wherein the operating variable value is determined based on the value associated by the model to the ambient parameter configuration value. The model may be of the form $$\sigma \propto e^{-\alpha(\pi)r}, \tag{3}$$

wherein $\sigma$ refers to the received signal feature, such as a received signal strength, $\alpha(\pi)$ refers to a function modeling the dependence of the propagation property $\alpha$ of the ambient medium, such as attenuation, from the ambient parameter $\pi$, such as a relative humidity, and r refers to a length of a propagation path of the received signal. The quantity $\sigma$ may be measured relative to its value in the vacuum. For instance, if the received signal feature is a received signal strength, $\sigma$ may refer to the received signal strength relative to the signal strength that would be received in the vacuum, which falls off with r according to an inverse square law.

It may be preferred that the transmission values of the signal feature for the network devices are constant during the reference time span, wherein the operating variable value determining unit is adapted to determine the value of the operating variable based on the received signal feature reference value that is related, via the reference relation, to an ambient parameter reference value corresponding to the ambient parameter configuration value as measured with respect to a received signal feature reference base value determined from one or more of the received signal feature reference values, wherein the received signal feature reference base value is characteristic, particularly in that it provides a reference value, for all received signal feature reference values recorded over the reference time span. In this way, a relative correlation of the ambient parameter with received signal feature values can be taken as a basis for determining the operating variable value. The received signal feature reference base value may be, for instance, a minimum, maximum or average of all received signal feature reference values recorded over the reference time span. In an embodiment where the signal feature is a signal strength and the operating variable is a correction factor by which received signal strengths are corrected, the base value may be the maximum of all received signal reference strengths recorded over the reference time span and the operating variable may be determined by a) determining, for each received signal reference strength recorded over the reference time span, a respective fraction of the received signal reference strength relative to the maximum and by b) setting the correction factor equal to the inverse of the fraction determined for the received signal reference strength related to the ambient parameter reference value corresponding to the ambient parameter configuration value.

In some embodiments, the configuration module further comprises a signal feature transmission reference value providing unit for providing signal feature transmission reference values corresponding to the received signal feature reference values, wherein the signal feature transmission reference values are indicative of a value which the signal feature had for the corresponding received signals when they were transmitted, wherein the operating variable value determining unit is adapted to determine the value of the operating variable based further on the signal feature transmission reference values. In this way, an absolute correlation of the ambient parameter with received signal feature values can be taken as a basis for determining the operating variable value. In particular, the operating variable value determining unit can be adapted to determine the value of the operating variable based on the received signal feature reference value that is related, via the reference relation, to an ambient parameter reference value corresponding to the ambient parameter configuration value, and the corresponding signal feature transmission reference value. The configuration module may further comprise a signal feature transmission configuration value providing unit for providing a signal feature transmission configuration value indicative of a value which the signal feature had for the signal received, at a configuration or current time, by the network device when it was transmitted, wherein the operating variable value determining unit may be adapted to determine the operating variable value further based on the signal feature transmission configuration value.

In further embodiments, the configuration module also comprises a deciding unit for deciding, based on the reference relation and the ambient parameter configuration value, whether a received signal feature value allows for a sufficient sensing performance, wherein the operating variable value determining unit is adapted to determine the value of an operating variable associated with the network device that has transmitted the signal if the received signal feature value does not allow for a sufficient sensing performance. For instance, if the ambient parameter relates to a relative humidity, the deciding unit can decide that the influence of the relative humidity is having at least temporarily on sensing in the sensing area cannot be easily mitigated by modifying an operating variable associated with the network device receiving a signal, or in fact any numerical correction of the received signal feature values collected in the radiofrequency sensing network. The deciding unit may then decide that it is instead necessary to alter the way that the data is being generated in the first place. If the operating variable value determining unit is adapted to determine a value of more than one operating variable associated with the network device, the deciding unit may further be adapted to estimate a performance gain that can be achieved by determining any one of the operating variable values separately and to decide that only the operating variable value for which the largest performance gain has been estimated is determined. The sensing performance may be defined in terms of a sensitivity, a specificity or an accuracy of sensing results, for instance. In particular, it may also be defined depending on a sensing task. The deciding unit can make the decision, for instance, based on an estimate of the sensing performance or based on a comparison of the received signal feature value with a predefined received signal feature value threshold, wherein the predefined received signal feature value threshold may be predefined such that it is likely, i.e. with a likelihood above a predetermined likelihood threshold, that the sensing performance achieved by the sensing network with the given received signal feature value will be below the predefined performance threshold. If the deciding unit decides that the received signal feature value does not allow for a sufficient sensing performance, the determined operating variable value associated with the network device that has transmitted the signal may refer to a frequency at which that network device transmits signals and/or to a propagation pattern according to which it transmits the signals. This may be particularly preferred if the received signal feature value is a received signal strength. The network device that has transmitted the signal may comprise antennas that are adapted to transmit signals accordingly. The operating variable may also refer to a choice of antennas used by the network device that has transmitted the signal.

In some embodiments, the transmission settings of a radio of the network device transmitting the radiofrequency signals are modified during periods where, based on the reference relation, it is determined that the relative humidity is affecting the sensing performance. This can include moving to a different channel within the radiofrequency band used, such as from channel 11 to 20 in the Zigbee standard, for instance, or moving altogether to a different part of the frequency spectrum, such as moving from sensing at 5 GHz to 2.4 GHz according to the Wi-Fi standard, for instance. Preferably, the modifications in the transmission settings are also done as a function of what types of modifications are estimated to be useful. For example, if an unusual increase in relative humidity is observed based on relative humidity configuration values recorded over a certain configuration time span including the configuration time, then the transmission frequencies may preferably be lowered, since this can be estimated to lead to signals being affected less strongly by the humidity in the environment. Conversely, if an unusual decrease in relative humidity is observed, transmission frequencies may preferably be increased.

In embodiments where the determined operating variable value associated with the network device that has transmitted the signal refers to a propagation pattern according to which that network device transmits signals, the operating variable can indicate, for instance, a form of a beam generated by the transmitted signals or an alternation between homogeneous distribution patterns and narrower, directional patterns, for instance. It may be preferred that the network devices are intentionally designed such that they are able to change the propagation patterns of signals transmitted by them, which may be done, for instance, by specifically designing their antennas and/or equipping them with different antennas specifically designed. If it is detected that the humidity in the environment of the radiofrequency sensing network is affecting the capability of the radiofrequency sensing network to accurately sense, an operating variable value associated with any of the network devices can be determined such that a generally less optimal antenna design is adopted by the respective network device, wherein the adopted antenna design may increase the sensing performance relative to a standard antenna design under particular ambient conditions, such as in very high humidity, for instance.

The deciding unit may be adapted to decide whether the received signal strength allows for a sufficient sensing performance based further on an operating variable associated with the network device that has received the signal, on a previous value of the operating variable associated with the network device that has transmitted the signal and/or on a previous value of another operating variable associated with the network device that has transmitted the signal. While the operating variable value determining unit may be adapted to determine the value of an operating variable associated with the network device that has transmitted the signal if the received signal feature value does not allow for a sufficient sensing performance, the operating variable value determining unit may still be adapted to determine, i.e. additionally, the value of an operating variable associated with the network device that has received the signal. The value of which kind of operating variable is determined or modified, particularly whether the value of an operating variable determining how received signal feature values are processed or an operating variable determining how signals are transmitted is determined or modified, may be decided depending on a sensing task, particularly a sensing target. For instance, if the sensing task is to sense the presence or motion of humans, which tend to absorb radiofrequency signals, different decisions may be made than if the sensing task is to sense the presence or motion of automobiles, which tend to reflect radiofrequency signals.

In principle, the radiofrequency sensing network can comprise only a single network device. Sensing can then be performed based on radiofrequency signals that are both transmitted by this single network device and also, i.e. after being reflected in the environment, received again by the same single network device. Accordingly, if there is only one network device in the radiofrequency sensing network, only a single reference relation needs to be provided. Preferably, however, the radiofrequency sensing network comprises at least one further network device, wherein the reference relation providing unit is adapted to provide more than one individual reference relation, wherein each of the individual reference relations is provided with respect to a different one of the network devices, the individual reference relations relating a) an ambient parameter reference value indicative of a reference value of the ambient parameter and b) an individual received signal feature reference value indicative of a reference value of a feature of a signal upon reception, wherein the received signal has been transmitted by the network device with respect to which the respective individual reference relation is provided, and wherein the operating variable value determining unit is adapted to determine an individual operating variable value with respect to each of the network devices based on the provided individual reference relations and the provided ambient parameter configuration value. If, for instance, the radiofrequency sensing network comprises two further network devices, three individual reference relations may be provided in total for a given network device, wherein one of the individual reference relations is the reference relation provided with respect to the network device itself. In case the network device is not adapted to receive signals transmitted by itself, only two individual reference relations need to be provided for the network device if the sensing network comprises two further network devices.

In some embodiments, the individual reference relations relate individual ambient parameter reference values to the individual received signal feature reference values, wherein the individual ambient parameter reference values have been recorded with respect to the network device with respect to which the respective individual reference relation is provided. In this way, a further increase in the independence of the sensing results from environmental conditions can be achieved, particularly if the distances between the network devices are such that variations in the value of the ambient parameter in the sensing area become significant. The individual ambient parameter reference values may relate to a part of the ambient medium between the network device that has received the signal and the network device that has transmitted the signal.

In further embodiments, the reference relation providing unit is adapted to provide the individual reference relation for a second network device with respect to a first network device by assuming it is identical to the individual reference relation for the first network device with respect to the second network device if the individual reference relation for the first network device with respect to the second network device has already been provided. Hence, in these embodiments, the reference relation providing unit is adapted to assume symmetric individual reference relations, thereby assuming that a correlation between the ambient parameter and an effect by the ambient medium on the propagation of signals is independent of a propagation direction of the signals. In this way, at most $(N^2-N)/2+N=N(N+1)/2$ individual reference relations need to be provided if the network comprises N network devices. If none of the N network devices of the radiofrequency sensing network is adapted to receive signals transmitted by itself, only $(N^2-N)/2=N(N-1)/2$ individual reference relations need to be provided when symmetric individual reference relations are assumed. Assuming symmetric individual reference relations may be particularly preferred if the signal feature is a signal strength or a signal-to-noise ratio. The individual reference relations that are provided by assuming symmetric individual reference relations are not necessarily identical to those which would be provided without this assumption, even if the effect by the ambient medium on the propagation of signals is independent of the propagation direction of the signals. This is because, in principle, transmission values of the signal feature for signals transmitted by a second network device and received by a first network device may be different from transmission values of the signal feature for signal transmitted by the first network device and received by the second network device, leading to different received signal feature values for the first and the second network device even if the effect by the ambient medium on the propagation of signals is independent of the propagation direction of the signals. However, the individual operating variable values determined based on the assumption of symmetric individual reference relations may, even in this case, lead to an increased independence of the sensing results from environmental conditions. Nevertheless, in many cases it may be preferred that the transmission values of the signal feature are the same for all signals transmitted via a channel, or even for signals transmitted by any network device in the network.

Any pair of network devices of the radiofrequency sensing network may be viewed as establishing a communication channel between them by virtue of the radiofrequency signals exchanged between them. Assuming symmetric individual reference relations, i.e. communication channels, and also the same transmission values of the signal feature for all signals exchanged along a given communication channel, the received signal feature reference values collected for the whole network can be reordered into channel sets, wherein each channel set comprises the received signal feature reference values corresponding to signals exchanged along the respective communication channel, i.e. in either direction. The received signal feature reference values corresponding to a given communication channel comprise the individual received signal feature reference values corresponding to signals received by each of the two network devices via the respective communication channel from the respective other of the two network devices. The set of all received signal feature reference values corresponding to signals communicated over a given communication channel may be referred to as channel received signal feature reference values. In some embodiments, the reference relation providing unit may be adapted to provide channel reference relations, wherein a channel reference relation relates ambient parameter values to channel received signal feature reference values for the respective channel. The operating variable value determining unit can then be adapted to determine the values of a channel operating variable as individual operating variable for each of the pair of network devices forming a given communication channel, wherein the channel operating variable value is determined based on the channel reference relation and the ambient parameter configuration value. In this way, generally twice as many received signal feature reference values, i.e. twice as much information, can be used for determining the individual operating variable values, which allows for a more accurate determination thereof.

In another aspect of the present invention, a radiofrequency sensing network is presented, wherein the radiofrequency sensing network comprises i) one or more network devices adapted to receive and transmit radiofrequency signals, and ii) the configuration module for configuring the network. Preferentially, also an ambient parameter measurement device is provided that is adapted to communicate measured values of the ambient parameter to the configuration module. The ambient parameter sensor may be integrated in one of the network devices or it may be integrated with the configuration module, such as in a control device for controlling the radiofrequency sensing network, for instance.

In a further aspect of the present invention, a configuration method for configuring a radiofrequency sensing network comprising one or more network devices adapted to receive and transmit radiofrequency signals is presented, wherein the configuration method comprises i) providing, for any one of the network devices, a reference relation between a) an ambient parameter reference value indicative of a reference value of an ambient parameter, wherein the ambient parameter correlates with a propagation property of an ambient medium for radiofrequency signals, and b) a received signal feature reference value indicative of a reference value of a feature of a signal that has propagated through the ambient medium has been received by the network device, ii) providing a configuration value of the ambient parameter indicative of a value of the ambient parameter at a configuration time, and iii) determining a value of an operating variable associated with the network device based on the provided reference relation and the provided ambient parameter configuration value.

In yet another aspect of the present invention, a computer program product for configuring the radiofrequency sensing network is presented, wherein the computer program product comprises program code means causing the configuration module to execute the configuration method.

It shall be understood that the configuration module as described above, the radiofrequency sensing network as described above, the configuration method as described above and the computer program product as described above have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

BRIEF DESCRIPTION OF THE DRAWINGS

In the following drawings:

FIG. 3 shows schematically and exemplarily an embodiment of the configuration method.

DETAILED DESCRIPTION OF EMBODIMENTS

Figure 1:
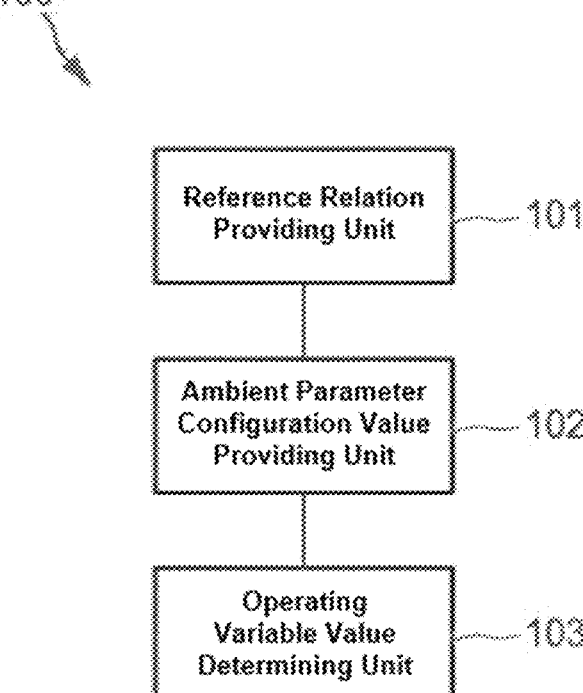
FIG. 1 shows schematically and exemplarily an embodiment of the configuration module.

FIG. 1 shows schematically and exemplarily a configuration module 100 for configuring a radiofrequency sensing network comprising one or more network devices adapted to receive and transmit radiofrequency signals. The configuration module 100 comprises a reference relation providing unit 101 for providing, for any one of the network devices, a reference relation between a) an ambient parameter reference value indicative of a reference value of an ambient parameter, wherein the ambient parameter correlates with a propagation property of an ambient medium for radiofrequency signals, and b) a received signal feature reference value indicative of a reference value of a feature of a signal that has propagated through the ambient medium and has been received by the network device. The ambient parameter may be a relative humidity in the ambient air, for instance, which correlates with the attenuation of radiofrequency signals propagating through the air. The feature of the signal received by the network device for which the reference relation is provided, i.e. the signal feature, may be a signal strength, wherein the received signal feature reference value may be a received signal strength indicator, or RSSI, recorded by the network device at a reference time. The reference relation is preferably a relation between ambient parameter reference values recorded over a reference time span including the reference time and corresponding received signal feature reference values.

The configuration module 100 further comprises an ambient parameter configuration value providing unit 102 for providing a configuration value of the ambient parameter indicative of a value of the ambient parameter at a configuration time. The configuration time is preferably a current time during which sensing takes place in the radiofrequency sensing network, while the reference time or reference time span, respectively, may lie in the past.

The configuration module 100 further comprises an operating variable value determining unit 103 for determining a value of an operating variable associated with the network device based on the provided reference relation and the provided ambient parameter configuration value. The operating variable value may indicate a modification of received signal feature values for signals received by the network device for which the reference relation is provided and/or a modification of a transmission value of the signal feature for a network device transmitting the signals, wherein the modified value of the signal feature may be used for sensing. For instance, the determined operating variable value may indicate a correction factor applied to received signal feature reference values before they are used for determining a sensing result and/or a change in a transmission parameter indicating how a signal is transmitted to the network device for which the reference relation has been provided in order to avoid potentially erroneous sensing results.

Figure 2:
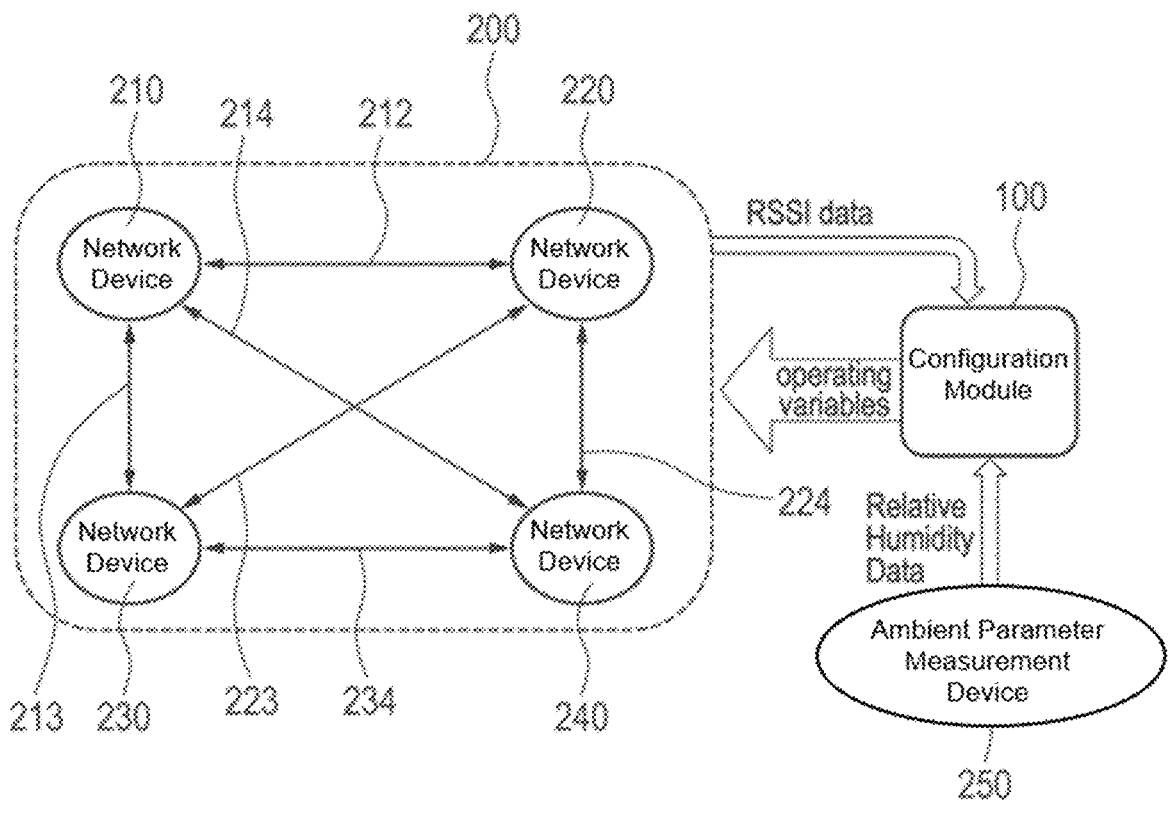
FIG. 2 shows schematically and exemplarily an embodiment of the radiofrequency sensing network with a configuration module.

FIG. 2 shows schematically and exemplarily a radiofrequency sensing network 200 comprising four network devices 210, 220, 230, 240 adapted to receive and transmit radiofrequency signals. In the illustrated embodiment, the reception and transmission of signals between the network devices 210, 220, 230, 240 constitutes six communication channels 212, 213, 214, 223, 224, 234, each of them established between respective two of the network devices 210, 220, 230, 240. Hence, in the embodiment illustrated in FIG. 2, the network devices 210, 220, 230, 240 do not receive signals transmitted by themselves. In many cases, the communication channels 212, 213, 214, 223, 224, 234 can be assumed to be symmetric in the sense that a dependence of the propagation property of the ambient medium along any one of the communication channels 212, 213, 214, 223, 224, 234 on the ambient parameter in the region corresponding to the respective communication channel 212, 213, 214, 223, 224, 234 is the same for signals propagating in one direction as for signals propagating in the opposite direction. For instance, a radiofrequency signal propagating along communication channel 212 from network device 210 towards the network device 220 may likely be equally affected by an attenuation caused by a relative humidity in the air present between the network device 210 and the network device 220 as a radiofrequency signal propagating along the communication channel 212 from the network device 220 towards the network device 210.

FIG. 2 also shows a configuration module 100 that is, in the illustrated embodiment, adapted to configure the radiofrequency sensing network by determining an operating variable value for each of the network devices 210, 220, 230, 240. The configuration module 100 may, as illustrated in FIG. 2, be viewed as an extension of the radiofrequency sensing network 200 comprising only the network devices 210, 220, 230, 240. However, the configuration module 100 may also be provided, for instance, as part of one of the network devices 210, 220, 230, 240, which may then be regarded as a configuration network device, as a separate device that may still be viewed as being part of the radiofrequency sensing network 200 or remotely in a cloud, for instance. The reference relation providing unit 101 of the configuration module 100 may continuously receive received signal feature values such as RSSI data from the network devices 210, 220, 230, 240. The received signal feature values can carry identifiers that allow to determine which of the network devices 210, 220, 230, 240 has transmitted a respective signal and which of the network devices 210, 220, 230, 240 has received the signal.

Moreover, the configuration module 100 may also continuously receive ambient parameter values measured and provided, for instance, by an ambient parameter measurement device 250, which may also be viewed as an extension to the radiofrequency sensing network 200. The ambient parameter values may be values of the relative humidity in the environment of the radiofrequency sensing network 200, wherein the environment may comprise the sensing area. In other embodiments, each of the network devices 210, 220, 230, 240 may comprise an ambient parameter measurement device like the ambient parameter measurement device 250, in which case the configuration module 100 may receive ambient parameter values from each of the ambient parameter measurement devices.

The received signal feature values and the ambient parameter values may be received by the reference relation providing unit 101 of the configuration module 100, which then provides, for each of the network devices 210, 220, 230, 240, an individual reference relation with respect to each of the other network devices 210, 220, 230, 240. For instance, the reference relation providing unit 101 provides, for the network device 210, an individual reference relation with respect to the network device 220, a further individual reference relation with respect to the network device 230 and yet a further individual reference relation with respect to the network device 240. By providing such individual reference relations for each of the network devices 210, 220, 230, 240, a total of twelve individual reference relations can be provided. However, the reference relation providing unit 101 is adapted to assume symmetric communication channels 212, 213, 214, 223, 224, 234, such that the reference relation providing unit 101 is adapted to provide the individual reference relation for any second of the network devices 210, 220, 230, 240 with respect to any first of the network devices 210, 220, 230, 240 by assuming it is identical to the individual reference relation for the first of the network devices 210, 220, 230, 240 with respect to the second of the network devices 210, 220, 230, 240 if the individual reference relation for the first of the network devices 210, 220, 230, 240 with respect to the second of the network devices 210, 220, 230, 240 has already been provided by the reference relation providing unit 101. Hence, the reference relation providing unit 101 only really needs to provide, i.e., for instance, store, six individual reference relations in the illustrated embodiment, wherein each of these six individual reference relations may be understood as being representative for one of the six different communication channels 212, 213, 214, 223, 224, 234, and may therefore also be referred to as a representative reference relation.

For providing the individual reference relations, the reference relation providing unit 101 may, during a reference time span, label the received signal feature values received by the network devices 210, 220, 230, 240 from each of the respective other network devices 210, 220, 230, 240 and the ambient parameter values received from the ambient parameter measurement device 250 as received signal feature reference values and ambient parameter reference values, respectively. The individual reference relations may then relate the ambient parameter reference values recorded over the reference time span to the respective received signal feature reference values. An individual reference relation for a given network device with respect to another network device may be viewed as a set of pairs, wherein each pair comprises an ambient parameter reference value measured at some reference time during the reference time span and a received signal feature reference value determined for a signal that has, after being transmitted by the other network device, been received by the given network device at the reference time.

In embodiments in which the ambient parameter refers to a relative humidity and the received signal feature refers to an RSSI, the reference relation providing unit 101 may, for instance, provide the six individual reference relations representative for the different communication channels 212, 213, 214, 223, 224, 234 of the network 200 shown in FIG. 2 in terms of a table like following Table 1.

TABLE 1

| Exemplary reference data (hence the indices "r") for configuring the radiofrequency sensing network 200 shown in FIG. 2. | | |
| --- | --- | --- |
| Communication channel | RSSI data | Relative humidity data |
| 212 | RSSI-212$_r$ | RH-212$_r$ |
| 213 | RSSI-213$_r$ | RH-213$_r$ |
| 214 | RSSI-214$_r$ | RH-214$_r$ |
| 223 | RSSI-223$_r$ | RH-223$_r$ |
| 224 | RSSI-224$_r$ | RH-224$_r$ |
| 234 | RSSI-234$_r$ | RH-234$_r$ |

As indicated in the left column of Table 1, each line of Table 1 corresponds to one of the six communication channels 212, 213, 214, 223, 224, 234. The individual reference relations representative for the respective communications channels 212, 213, 214, 223, 224, 234 are formed by the entries in the middle and the right column of Table 1. For instance, the entries in the middle and the right column of Table 1 for a given line can be lists, respectively, wherein the entries in the lists correspond to a plurality of reference times during the reference time span for which the RSSI and relative humidity values have been determined and wherein the respective representative reference relation is formed by relating the RSSI and relative humidity values determined for the same reference time to each other. If the RSSI and relative humidity values are ordered chronologically in the respective lists, the individual reference relation representative for the communication channel 212, for instance, can be formed by relating the first entry of the list RSSI-212$_r$ to the first entry of the list RH-212$_r$, the second entry of the list RSSI-212$_r$ to the second entry of the list RH-212$_r$ et cetera.

Instead of all RSSI values collected over the reference time span, the entries in the middle column of Table 1 can also correspond to information derived from the actual RSSI values. This information can relate to, for instance, an average RSSI in the reference time span, RSSI data dynamics, such as whether the RSSI values are stable or fluctuating, the highest/lowest RSSI values in the reference time span, a trend, such as whether the RSSI values are increasing or decreasing in the reference time span, and/or a trend-behavior, such as whether a change in RSSI values in the reference time span is, for instance, linear or exponential. Likewise, instead of all relative humidity values determined over the reference time span, the entries in the right column of Table 1 can also correspond to information derived from the actual relative humidity values determined for the sensing area during the reference time span. This information can relate to, for instance, an average relative humidity, relative humidity dynamics, such as whether the relative humidity values are stable or fluctuating, high/low, particularly the highest/lowest, relative humidity values in the reference time span, a trend, such as whether the relative humidity values are increasing or decreasing in the reference time span, and/or a trend-behavior, such as whether a change in relative humidity values in the reference time span is linear or exponential, for instance.

At a configuration time, the ambient parameter values received from the ambient parameter measurement device 250 may be labelled as ambient parameter configuration values and as such provided by the ambient parameter configuration value providing unit 102. Typically, the radiofrequency sensing network 200 is configured by the configuration module 100 based on reference relations determined for a reference time span that lies temporally before the configuration time. In particular, the configuration time may be a current time during which sensing in the radiofrequency sensing network 200 takes place. However, it is understood that the configuration time may lie in a reference time span during which reference relations are determined that may later be used for a further configuration of the radiofrequency sensing network 200. Hence, for instance, a given ambient parameter value received from the measurement device 250 may be used as an ambient parameter configuration value for a current configuration and as an ambient parameter reference value for a configuration in the future. Likewise, in embodiments in which the configuration module 100 further comprises a received signal feature configuration value providing unit, the received signal feature configuration value providing unit may receive the same received signal feature values as the reference relation providing unit 101 from the network devices 210, 220, 230, 240, wherein, however, at the configuration time for a given configuration, the received signal feature configuration value providing unit may label the received signal feature values as received signal feature configuration values and provide them as such.

The operating variable value determining unit 103 of the configuration module 100 determines, for each of the network devices 210, 220, 230, 240, a value of an individual operating variable with respect to each of the respective other network devices 210, 220, 230, 240 based on the provided reference relations and the provided ambient parameter configuration value. Since, assuming symmetric communication channels 212, 213, 214, 223, 224, 234, the individual operating variables are effectively determined based on only the six individual reference relations representative for the different communication channels 212, 213, 214, 223, 224, 234 and the provided ambient parameter configuration value, effectively only six different operating variables are determined for a given ambient parameter configuration value, each of them corresponding to a different one of the communication channels 212, 213, 214, 223, 224, 234. The operating variables determined under the assumption of symmetric individual reference relations, i.e. communication channels 212, 213, 214, 223, 224, 234, may therefore also be referred to as channel operating variables.

In embodiments in which the reference relation providing unit 101 has provided the six individual reference relations representative for the different communication channels 212, 213, 214, 223, 224, 234 in terms of a table like Table 1, the ambient parameter configuration value providing unit

102 and the operating variable value determining unit 103 may, for instance, provide a configuration table like following Table 2.

TABLE 2

| Exemplary configuration data (hence the indices "c") of the radiofrequency sensing network 200 shown in FIG. 2. | | | |
|---|---|---|---|
| Communication channel | RSSI data | Relative humidity data | Correction factor |
| 212 | RSSI-$212_c$ | RH-$212_c$ | CF-$212_c$ |
| 213 | RSSI-$213_c$ | RH-$213_c$ | CF-$213_c$ |
| 214 | RSSI-$214_c$ | RH-$214_c$ | CF-$214_c$ |
| 223 | RSSI-$223_c$ | RH-$223_c$ | CF-$223_c$ |
| 224 | RSSI-$224_c$ | RH-$224_c$ | CF-$224_c$ |
| 234 | RSSI-$234_c$ | RH-$234_c$ | CF-$234_c$ |

Table 2 specifically illustrates embodiments in which the configuration module 100 further comprises a received signal feature configuration value providing unit providing, as illustrated in the second column of Table 2, the received signal feature configuration values, in this case the channel RSSI data from a configuration time span possibly corresponding to the reference time span, that are representative for the respective communication channels indicated in the first column. Like the RSSI reference data in Table 1, also the RSSI configuration data may be stored in Table 2 in the form of lists with entries corresponding to different configuration times within the configuration time span.

The third column of Table 2 contains ambient parameter configuration values, i.e., in this case the relative humidity data determined over the configuration time span.

The fourth column of Table 2 contains the operating variable values determined by the operating variable value determining unit 103, which are in this case correction factors by which received signal strengths may be multiplied during sensing to account for effects on signal propagation by varying environmental conditions. For each communication channel, i.e. for each line in Table 2, a single correction factor is determined. In other embodiments, however, it is also possible that several correction factors are determined, particularly one correction factor for each entry in the list of RSSI values provided over the configuration time span, for instance, which may correspond to the RSSI to be modified for achieving the sensing results. The correction factors are determined, for the respective communication channels indicated in the first column of Table 2, based on the reference relations formed by the second and third column of Table 1, and the relative humidity at configuration as contained in the third column of Table 2 and, in this case, also the RSSI data at configuration as contained in the second column of Table 2. For instance, the correction factor CF-$212_c$ is determined based on the reference relation formed by the values RSSI-$212_r$ and RH-$212_r$ and based on the values RSSI-$212_c$ and RH-$212_c$. Sensing in the radiofrequency sensing network 200 can subsequently be performed using the correction factors from the fourth column of Table 2.

Instead of all RSSI values collected over the configuration time span, the entries in the second column of Table 2 can also correspond to information derived from the actual RSSI values. This information can relate to, for instance, an average RSSI in the configuration time span, RSSI data dynamics, such as whether the RSSI values are stable or fluctuating, the highest/lowest RSSI values in the configuration time span, a trend, such as whether the RSSI values are increasing or decreasing in the configuration time span, and/or a trend-behavior, such as whether a change in RSSI values in the configuration time span is, for instance, linear or exponential. Likewise, instead of all relative humidity values determined over the configuration time span, the entries in the third column of Table 2 can also correspond to information derived from the actual relative humidity values determined for the sensing area during the configuration time span. This information can relate to, for instance, an average relative humidity, relative humidity dynamics, such as whether the relative humidity values are stable or fluctuating, high/low, particularly the highest/lowest, relative humidity values in the configuration time span, a trend, such as whether the relative humidity values are increasing or decreasing in the configuration time span, and/or a trend-behavior, such as whether a change in relative humidity values in the configuration time span is linear or exponential, for instance.

FIG. 3 shows schematically and exemplarily a configuration method 400 for configuring a radiofrequency sensing network, like the network 200, comprising one or more network devices adapted to receive and transmit radiofrequency signals. In a first step 401 of the method, for any one of the network devices, a reference relation is provided. The reference relation is a relation between a) an ambient parameter reference value indicative of a reference value of an ambient parameter and b) a received signal feature reference value indicative of a reference value of a feature of a signal that has propagated through the ambient medium has been received by the network device. The ambient parameter correlates with a propagation property of an ambient medium for radiofrequency signals. In a second step 402, a configuration value of the ambient parameter indicative of a value of the ambient parameter at a configuration time is provided, and in a third step 403, a value of an operating variable associated with the network device is provided based on the provided reference relation and the provided ambient parameter configuration value.

Radiofrequency (RF) sensing is using variations in the received signal feature reference value such as the received signal strength (RSSI) or general quality of signals (CSI) between pairs of network devices to find out whether there is something happening in the sensing area of the RF sensing network, e.g., presence of a user. RF sensing may be extended to sensing gesture of a user, vital signs of a user such as heart rate, breathing patter, and sleep monitoring of a user etc. The reasons why RSSI/CSI is changing can be a) dynamic, leading to fast changes in RSSI/CSI data, such as caused by moving objects like a person or car in the sensing area, for instance, wherein "fast" refers to the RSSI/CSI data changes during every measurement, or b) trends, leading to slowly changing RSSI/CSI data, such as caused by changes in the environmental conditions like temperature or humidity, wherein "slow" refers to the RSSI/CSI data changes following a trend curve, which may increase or decrease during a certain period of measurements, for instance. Identifying such trend-like changes can lead to an improved accuracy for identifying the dynamic changes caused by actual sensing objects.

The information provided by an RF sensing network technology can be used for several functions, such as motion detection or room occupancy sensing. Certain environmental conditions, however, influence the actual measurements of, for instance, signal strength, and therefore have an impact on the reliability of the detection results. The above described means allow for correcting the actual baselining in case, for instance, the humidity (or a related temperature) in the environment of the sensing network is changing.

The accuracy and reliability of the RF sensing results depends on the correct interpretation of the actual RSSI/CSI raw data. The actual RSSI/CSI baseline data can be impacted by the humidity in the sensing area, which can lead to a misinterpretation of the data, causing less reliable results of the detection. For instance, seasonal changes bring inevitable temperature and humidity changes indoors. Even if the air is mechanically processed, eventually it originates from outdoors. Hence, the indoor humidity changes greatly with the seasons. While the recommended relative humidity indoors is between 30 and 50 percent, during cold weather, it can drop to values as low as 10 percent. The humidity also varies greatly on location. For example, in the Netherlands, relative humidity is between 70 and 80 percent, hence significantly higher compared to Finland. Indoor humidity exceeding 60 percent leads to an attractive environment for mold, mildew, bacteria and rot inside the home, but are not uncommonly found in houses. Described herein are means for, e.g., correcting the actual RSSI/CSI data with a correction factor within an RF sensing network. The configuration module, which may also be viewed, possibly together with a humidity sensor as ambient parameter measurement device, as a humidity data collector can collect and analyze the RSSI/CSI data during a certain period like the reference time span. After analyzing the data, for instance, a correction factor for the RF sensing network can be calculated, which each of the two network devices communicating via a given communication channel in the RF sensing network can apply. The configuration module, in this case, makes use of the data from the humidity sensor and the RSSI/CSI data collected from the RF sensing network. Assuming symmetry, or reciprocity, of the communication channels, the "forward link" of a given communication channel can be assumed to match the "backward link", such that only one of the two links needs to be monitored for the analysis. A correction factor per communication channel, i.e. pair of network devices, may be required as each communication channel has its own characteristics with respect to the level of signal strengths and variation dynamics. When applying the correction factor for each of the pairs of network devices forming the different communication channels, these characteristics can be included into the calculation to get the real correction on the actual data. The reference baseline can be measured during a setup period like the reference time span, and after finalizing the setup period, the baseline can be stored as the reference baseline for the system. During this setup period, preferably the environment is stable, i.e., for instance, with no humans in the sensing.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the providing of the reference relation, the providing of the ambient parameter configuration value, the determining of the value of the operating variable, et cetera, performed by one or several units or devices can be performed by any other number of units or devices. These procedures can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention refers to a configuration module for configuring a radiofrequency sensing network with network devices. The configuration module comprises a providing unit for providing a reference relation between a) an ambient parameter value, wherein the ambient parameter correlates with a propagation property of an ambient medium for radiofrequency signals, and b) a received signal feature value indicative of a signal that has propagated through the ambient medium and has been received by the network device. A further providing unit provides a configuration value of the ambient parameter indicative of a value of the ambient parameter at a configuration time, and a determining unit determines a value of an operating variable associated with the network device based on the reference relation and the configuration value. This allows to achieve an increased independence of the sensing results from environmental conditions.

The invention claimed is:

1. A configuration module for configuring a radiofrequency sensing network comprising one or more network devices adapted to receive and transmit radiofrequency signals, the configuration module comprising:

a reference relation provider configured to provide a reference relation for any one of the one or more network devices between a) an ambient parameter reference value indicative of a reference value of an ambient parameter, wherein the ambient parameter correlates with a propagation property of an ambient medium for the radiofrequency signals, and b) a received signal feature reference value indicative of a reference value of a feature of a signal that has propagated through the ambient medium and has been received by an individual one of the one or more network devices, an ambient parameter configuration value provider configured to provide a configuration value of the ambient parameter indicative of a value of the ambient parameter at a configuration time, and an operating variable value determiner configured to determine a value of an operating variable associated with the individual one of the one or more network devices based on the provided reference relation and the provided ambient parameter configuration value;

wherein the operating variable indicates a modification of a value of a received signal feature for signals received by the individual one of the one or more network devices and/or a modification of a transmission value of a signal feature for the individual one of the one or more network devices transmitting the radiofrequency signals, the modified value of the received signal feature for the signals received by the individual one of the one or more network devices and/or the modification of the transmission value of the signal feature for the individual one of the one or more network devices is used for sensing; and wherein the reference relation provider, the ambient parameter configuration value provider, and the operating variable value determiner further comprise dedicated computer hardware.

2. The configuration module according to claim 1, further comprising:

an implementer configured to implement a configuration of the network based on the determined value of the operating variable.

3. The configuration module according to claim 2, further comprising:

a signal feature transmission reference value provider configured to provide signal feature transmission reference values corresponding to received signal feature reference values, wherein the signal feature transmission reference values are indicative of values that signal features had for the received signals when transmitted, wherein the operating variable value determiner is configured to determine the value of the operating variable based further on the signal feature transmission reference values, and the signal feature transmission reference value provider further comprises dedicated computer hardware.

4. The configuration module according to claim 1, wherein the reference relation has been recorded over a reference time span, thereby relating ambient parameter reference values recorded over the reference time span to corresponding received signal feature reference values.

5. The configuration module according to claim 4, wherein the transmission value of the signal feature for the individual one of the one or more network devices is constant during the reference time span, wherein the operating variable determiner is configured to determine the value of the operating variable based on an individual received signal feature reference value that is related, via the reference relation, to an ambient parameter reference value corresponding to the ambient parameter configuration value as measured with respect to a received signal feature reference base value determined from one or more of the corresponding received signal feature reference values, and wherein the received signal feature reference base value is characteristic for all received signal feature reference values recorded over the reference time span.

6. The configuration module according to claim 1, wherein the operating variable determiner is configured to determine the value of the operating variable based on received signal feature reference values corresponding to different ambient parameter reference values.

7. The configuration module according to claim 1, wherein the one or more network devices comprises a plurality of network devices, wherein the reference relation provider is configured to provide more than one individual reference relation, wherein each of the individual reference relations is provided with respect to a different one of the plurality of network devices, the individual reference relations relating a) an ambient parameter reference value indicative of a reference value of the ambient parameter and b) an individual received signal feature reference value indicative of a reference value of a feature of a signal upon reception, wherein a received signal corresponding to the individual received signal feature reference value has been transmitted by a respective network device of the plurality of network devices with respect to which the corresponding individual reference relation is provided thereto, and wherein the operating variable value determiner is configured to determine an individual operating variable value with respect to each of the plurality of network devices based on the provided individual reference relations and the provided ambient parameter configuration value.

8. The configuration module according to claim 7, wherein the individual reference relations relate one or more individual ambient parameter reference values to the individual received signal feature reference value, and the individual ambient parameter reference values have been recorded with respect to the respective network device of the plurality of network devices with respect to which the respective individual reference relation is provided thereto.

9. The configuration module according to claim 8, wherein the one or more network devices comprise at least first and second network devices, the reference relation provider is configured to provide an individual reference relation for the second network device with respect to the first network device by assuming the individual reference relation for the second network device is identical to an individual reference relation for the first network device with respect to the second network device if the individual reference relation for the first network device with respect to the second network device has already been provided.

10. A configuration method for configuring a radiofrequency sensing network comprising one or more network devices adapted to receive and transmit radiofrequency signals, the configuration method comprising:

providing, for one particular individual one of the one or more network devices, a reference relation between a) an ambient parameter reference value indicative of a reference value of an ambient parameter, the ambient parameter corelating with a propagation property of an ambient medium for the radiofrequency signals, and b) a received signal feature reference value indicative of a reference value of a feature of a signal that has propagated through the ambient medium has been received by the individual one of the one or more network devices, providing a configuration value of the ambient parameter indicative of a value of the ambient parameter at a configuration time, and determining a value of an operating variable associated with the individual one of the one or more network devices based on the provided reference relation and the provided ambient parameter configuration value, the operating variable indicating a modification of a value of a received signal feature for signals received by the individual one of the one or more network devices and/or a modification of a transmission value of a signal feature for the individual one of the one or more network devices transmitting the radiofrequency signals, the modified value of the received signal feature for the signals received by the individual one of the one or more network devices and/or the modification of the transmission value of the signal feature for the individual one of the one or more network devices being used for sensing.

11. A non-transitory computer-readable medium comprising instructions for configuring a radiofrequency sensing network that cause a computer to carry out the method of claim 10 when executed.

* * * * *